US009842266B2

(12) United States Patent
Bulan et al.

(10) Patent No.: US 9,842,266 B2
(45) Date of Patent: Dec. 12, 2017

(54) METHOD FOR DETECTING DRIVER CELL PHONE USAGE FROM SIDE-VIEW IMAGES

(71) Applicant: Conduent Business Services, LLC, Dallas, TX (US)

(72) Inventors: Orhan Bulan, Henrietta, NY (US); Yusuf O. Artan, Ankara (TR); Robert P. Loce, Webster, NY (US); Peter Paul, Penfield, NY (US)

(73) Assignee: Conduent Business Services, LLC, Dallas, TX (US)

( * ) Notice: Subject to any disclaimer, the term of this patent is extended or adjusted under 35 U.S.C. 154(b) by 94 days.

(21) Appl. No.: 14/614,746

(22) Filed: Feb. 5, 2015

(65) Prior Publication Data
US 2015/0286885 A1 Oct. 8, 2015

Related U.S. Application Data
(60) Provisional application No. 61/975,440, filed on Apr. 4, 2014.

(51) Int. Cl.
*G06K 9/62* (2006.01)
*G06K 9/00* (2006.01)
*G06K 9/46* (2006.01)

(52) U.S. Cl.
CPC ....... *G06K 9/00845* (2013.01); *G06K 9/4642* (2013.01)

(58) Field of Classification Search
USPC ..... 1/1; 340/686.1, 932.2, 438, 576; 348/77, 348/148; 351/210; 382/103, 104, 118; 455/414.1, 418; 704/235; 705/4; 715/863
See application file for complete search history.

(56) References Cited

U.S. PATENT DOCUMENTS

| 6,914,541 | B1 | 7/2005 | Zierden |
| 6,970,102 | B2 | 11/2005 | Ciolli |
| 7,055,639 | B2 | 6/2006 | Kiribayashi |
| 7,194,114 | B2* | 3/2007 | Schneiderman ....... G06K 9/527 382/118 |
| 7,504,965 | B1 | 3/2009 | Windover |

(Continued)

OTHER PUBLICATIONS

Berri, R. A., "A pattern recognition system for detecting use of mobile phones while driving," Intl. Conf. on Computer Vision Theory and Applications (VISAPP), vol. 2, pp. 411-418, Jan. 5-8, 2014, Lisbon, Portugal.*

(Continued)

*Primary Examiner* — Xuemei Chen
(74) *Attorney, Agent, or Firm* — Fay Sharpe LLP

(57) ABSTRACT

A system and method for detecting electronic device use by a driver of a vehicle including acquiring an image including a vehicle from an associated image capture device positioned to view oncoming traffic, locating a windshield region of the vehicle in the captured image, processing pixels of the windshield region of the image for computing a feature vector describing the windshield region of the vehicle, applying the feature vector to a classifier for classifying the image into respective classes including at least classes for candidate electronic device use and candidate electronic device non-use, and outputting the classification.

16 Claims, 8 Drawing Sheets

(56) References Cited

U.S. PATENT DOCUMENTS

| | | | |
|---|---|---|---|
| 7,508,979 B2* | 3/2009 | Comaniciu | G06K 9/00248 382/103 |
| 7,646,312 B2* | 1/2010 | Rosen | H04M 3/2281 340/933 |
| 7,786,897 B2 | 8/2010 | Alves | |
| 7,792,328 B2* | 9/2010 | Albertson | B60W 40/09 340/576 |
| 7,853,072 B2* | 12/2010 | Han | G06K 9/4642 382/103 |
| 7,898,402 B2 | 3/2011 | Odate et al. | |
| 8,013,760 B2 | 9/2011 | Turnock et al. | |
| 8,103,402 B2 | 1/2012 | Kozlay | |
| 8,384,555 B2* | 2/2013 | Rosen | G06K 9/00785 340/686.1 |
| 8,478,237 B1* | 7/2013 | Stenta | H04M 1/67 340/438 |
| 8,644,561 B2* | 2/2014 | Burry | G06K 9/6279 382/107 |
| 8,688,180 B2* | 4/2014 | Catten | H04W 24/08 455/41.2 |
| 8,731,530 B1* | 5/2014 | Breed | H04M 1/72577 455/414.1 |
| 8,744,132 B2* | 6/2014 | Bulan | G06K 9/00771 340/903 |
| 8,824,742 B2* | 9/2014 | Skaff | G06K 9/00785 382/104 |
| 8,914,014 B2* | 12/2014 | Vidal | H04W 8/22 455/418 |
| 8,971,581 B2* | 3/2015 | Wu | G06K 9/00785 340/932.2 |
| 9,137,498 B1* | 9/2015 | L'Heureux | H04N 7/18 |
| 9,165,201 B2* | 10/2015 | Zhang | G06K 9/00362 |
| 9,330,305 B2* | 5/2016 | Zhao | G06K 9/00369 |
| 2003/0137408 A1 | 7/2003 | Breiner | |
| 2005/0151671 A1 | 7/2005 | Bortolotto | |
| 2005/0190953 A1 | 9/2005 | Nagahashi et al. | |
| 2006/0055561 A1 | 3/2006 | Kamali et al. | |
| 2006/0056667 A1* | 3/2006 | Waters | G06K 9/00255 382/118 |
| 2006/0291697 A1* | 12/2006 | Luo | G06K 9/00369 382/104 |
| 2008/0036623 A1 | 2/2008 | Rosen | |
| 2010/0035632 A1 | 2/2010 | Catten | |
| 2010/0130182 A1 | 5/2010 | Rosen | |
| 2010/0271497 A1 | 10/2010 | Monsive, Jr. | |
| 2010/0323657 A1 | 12/2010 | Barnard | |
| 2011/0298924 A1* | 12/2011 | Miller | H04M 1/6075 348/148 |
| 2012/0040650 A1 | 2/2012 | Rosen | |
| 2012/0069183 A1 | 3/2012 | Aoki et al. | |
| 2012/0147194 A1 | 6/2012 | Wang et al. | |
| 2012/0200682 A1 | 8/2012 | Mestha et al. | |
| 2012/0212593 A1 | 8/2012 | Na'aman | |
| 2012/0214463 A1* | 8/2012 | Smith | H04M 1/72577 455/418 |
| 2013/0070957 A1 | 3/2013 | Zhang et al. | |
| 2013/0148845 A1 | 6/2013 | Maeda | |
| 2013/0150004 A1 | 6/2013 | Rosen | |
| 2013/0235347 A1* | 9/2013 | Hennessey | G06F 3/013 351/210 |
| 2013/0271605 A1* | 10/2013 | Winner, Jr. | B60Q 1/50 348/148 |
| 2013/0332160 A1* | 12/2013 | Posa | G06F 3/013 704/235 |
| 2014/0223384 A1* | 8/2014 | Graumann | G06F 3/012 715/863 |
| 2015/0031349 A1* | 1/2015 | Hill | H04M 1/72577 455/418 |
| 2015/0054639 A1 | 2/2015 | Rosen | |
| 2015/0186714 A1* | 7/2015 | Ren | G06K 9/00369 348/77 |
| 2015/0193885 A1* | 7/2015 | Akiva | G06Q 40/08 705/4 |
| 2015/0286884 A1* | 10/2015 | Xu | G06K 9/00845 382/103 |
| 2015/0286885 A1 | 10/2015 | Bulan | |
| 2015/0324653 A1* | 11/2015 | Xu | G06K 9/00838 348/148 |

OTHER PUBLICATIONS

U.S. Appl. No. 13/527,228, filed Jun. 19, 2012.

Paul, Peter; Burry, Aaron M.; Wang, Yuheng; Kozitsky, Vladimir "Application of the SNoW machine learning paradigm to a set of transportation imaging problems" Proceedings of the SPIE, vol. 8305, article id. 830512, 11 pp. (2012)

Xiaoli Hao; Houjin Chen; Jie Li, "An Automatic Vehicle Occupant Counting Algorithm Based on Face Detection," Signal Processing, 2006 8th International Conference on, vol. 3, No., pp. 16-20 2006.

Viola et al., "Robust Real-Time Face Detection", International Journal of Computer Vision, vol. 57, pp. 137-154, 2007.

U.S. Appl. No. 13/215,401, filed Aug. 23, 2011, by Fan et al., entitled "Front Seat Vehicle Occupancy Detection via Seat Pattern Recognition".

Birch et al., "Automated Vehicle Occupancy Monitoring", Optical Engineering, vol. 43 pp. 1828-1832, 2004.

Csurka et al., "Visual Categorization with Bags of Keypoints", ECCV SLCV, 2004.

Perronnin et al., "Fisher Kernels on Visual Vocabularies for Image Categorization", CVPR, 2007.

Perronnin et al., "Improving the Fisher Kernel for Large-Scale Image Classification", ECCV, 2010.

U.S. Appl. No. 13/312,414, filed Dec. 6, 2011, by Edul N. Dalai et al., entitled "Vehicle Occupancy Detection via Single Band Infrared Imaging".

Pavlidis et al., "A Vehicle Occupant Counting System Based on Near-Infrared Phenomenology and Fuzzy Neural Classification", IEEE Transactions on Intelligent Transportation Systems, vol. 1, No. 2, Jun. 2000, pp. 72-85.

"High Occupancy Vehicle Detection" by Perez-Jimenez et al.

Nilsson et al. "Face Detection Using Local SMQT Feature and Split Up Snow Classifier".

* cited by examiner

METHOD FOR DETECTING DRIVER CELL PHONE USAGE FROM SIDE-VIEW IMAGES

CROSS REFERENCE TO RELATED PATENTS AND APPLICATIONS

This application claims priority to and the benefit of the filing date of U.S. Provisional Patent Application Ser. No. 61/975,440, filed Apr. 4, 2014, which application is hereby incorporated by reference.

BACKGROUND

The present disclosure relates to an image-based method and system for detecting vehicle occupant activities. The disclosure finds application in detecting certain activities such as electronic device use by a driver of a vehicle. However, it is to be appreciated that the present exemplary embodiments are also amendable to other like applications.

Mobile phone use (talking/texting) while driving is common, but widely considered dangerous. According to a recent government study of distracted driving, 995 out of 5474 (18%) who were killed by distracted drivers in 2009 were considered to be killed by drivers distracted by mobile phones. Due to the high number of accidents that are related to mobile phone use while driving, many jurisdictions, including many U.S. states, have made the use of a mobile phone and/or other devices while driving illegal. For example, at least ten U.S. states, Washington D.C., Puerto Rico, Guam and the U.S. Virgin Islands prohibit all drivers from using hand-held mobile phones while driving.

Many of the enacted laws are primary enforcement which means an officer may cite a driver for using a hand-held mobile phone without any other traffic offense taking place. However, to enforce the rules, current practice requires dispatching law enforcement officers at the road side to visually examine oncoming cars or having human operators manually examine image/video records to identify violators. Both of the processes are expensive, difficult, and ultimately ineffective. Therefore, there is a need for an automatic or semi-automatic solution.

A variety of approaches have been developed for detecting mobile phone use. In one approach, a sensor is installed in a vehicle (with an adjustable range) to detect cell phone usage within that range. Another approach uses a combination of bluetooth signals and vehicle speakers. Both of these approaches require special sensing devices besides a camera.

Yet another approach uses multi-spectral images or videos of individuals and analyzes the data to identify skin pixels and cell phone pixels within the image or the video based on a set of material characteristics. This approach requires special multispectral cameras (non-silicon based, e.g. indium gallium arsenide) and illuminators in the wavelength range of 1000 nm~1700 nm, which are expensive (e.g., the camera can cost up to $50,000) compared to conventional silicon-based cameras of lower wavelength range (<1000 nm).

Past approaches that focus on object recognition by searching for objects (e.g., mobile phone) based on image content assumptions have not obtained a high level of accuracy. This approach is based on the assumption that different objects within the image, such as faces, seats, seat belts, and electronic devices are visible to the camera. Therefore, parts of the image are analyzed to determine a location of the objects and appearance characteristics, such as color, size, texture, and shape, etc., of the objects. In one example, the appearance characteristic can include spectral features, which can be extracted for detecting pixels belonging to the skin of an occupant. The extraction of the appearance characteristics can be performed via a feature representation of the object. The objects in the image that have characteristics that match a reference object (e.g. mobile phone), are associated as being the same as the reference object. In other words, the object is labeled as being an occupant or a seat or a mobile phone, etc.

One problem associated with conventional object detection is that variations in the captured image can result in incorrect classifications. Moreover, when the particular object is fully or partially obscured, conventional object detection will most likely fail. For example, the object recognition approach may incorrectly classify an image as having a cell phone when a driver is holding another object, such as box of cigarettes. In this instance, the appearance characteristics that are extracted from the image match those of a mobile phone. In another variation in which an occupant is holding a phone to their ear, the object recognition approach may incorrectly classify an image as not having a cell phone, particularly when the mobile phone is partially or wholly obscured from the camera.

Accordingly, there is a need for an improved and more accurate automatic or semi-automatic detection of occupant activities that does not require special equipment or sensors. A system and a method are needed that classify an entire windshield and/or cabin region instead of searching for specific objects situated inside parts of the image and using appearance and spectral features. More specifically, there is needed an approach that makes no assumptions about the content of images in advance of the process.

INCORPORATION BY REFERENCE

The following reference, the disclosure of which is incorporated herein in its entirety by reference is mentioned:

U.S. application Ser. No. 13/527,228, filed Jun. 19, 2012.

BRIEF DESCRIPTION

The method and system set forth in the present disclosure uses images and computer vision techniques to classify a region as including or not including an electronic device. As described below, aspects of the present disclosure can be incorporated within current transportation imaging systems, does not require (but may utilize) a multispectral camera, is not foiled by new "California glass," and has a high level of accuracy.

In accordance with one aspect, a method for detecting electronic device use by a driver of a vehicle, comprises acquiring a first image including a vehicle from an associated image capture device positioned to view oncoming traffic, locating a first region of the vehicle in the first image, processing pixels of the first region of the first image for computing a feature vector describing the located region of the vehicle, applying the feature vector to a classifier for classifying the first image into respective classes including at least classes for candidate electronic device use and candidate electronic device non-use and calculating confidence scores for each case, acquiring a second image including the vehicle from an associated image capture device positioned to view oncoming traffic, locating a second region of the vehicle in the second image, processing pixels of the second region of the second image for computing a feature vector describing the selected second region of the vehicle, applying the feature vector to a classifier for classifying the second image into respective classes including at least classes for candidate electronic device use and candidate electronic device non-use and calculating confidence scores for each case; and, fusing the classification scores obtained from the first and second classifiers, outputting the final classification result after fusion.

The processing the pixels of the located first region can include extracting the windshield region from the image. The method can further comprise defining a passenger side and a driver side within the windshield region, and extracting the driver side of the windshield region from the windshield region; defining a passenger side and a driver side within the windshield region, and extracting the passenger side of the windshield region from the windshield region; and/or processing the pixels of the located second region including extracting a passenger side window region from the image. The processing the images can be performed by a process selected from a group consisting of: a Successive Mean Quantization Transform (SMQT); a Scale-Invariant Feature Transform (SIFT); a Histogram of Gradients (HOG); a Bag-of-Visual-Words Representation; a Fisher Vector (FV) Representation; a Speeded Up Robust Feature (SURF) representation; a Local Binary Pattern (LBP) representation; and, a combination of the above.

The method can further comprise, before acquiring the images, training a classifier using at least a first sample image including a driver holding an electronic device and at least a second sample image including a driver not holding an electronic device, the first and second sample images including at least a corresponding first region or second region of a sample vehicle. In response to the vehicle being classified as a candidate electronic device user, performing further processing on the image for determining whether the vehicle is a violator or non-violator.

The method can also include, analyzing at least one of the first or second images to detect whether a passenger is present in the vehicle. The classification score of the second image can be adjusted when a passenger is detected.

In accordance with another aspect, a system configured to perform image analysis for detecting electronic device use by a driver of a vehicle comprises at least one of an image capture device operably connected to a data processing device that captures a first image of a target vehicle including a windshield region and a second image of the target vehicle including a side window region, and a processor-usable medium embodying computer code, said processor-usable medium being coupled to said data processing device, said computer program code comprising instructions executable by said processor and configured for: locating a windshield region of the vehicle in the first image; processing pixels of the windshield region of the first image for computing a feature vector describing the windshield region of the vehicle; applying the feature vector to a classifier for classifying the image into respective classes including at least classes for candidate electronic device use and candidate electronic device non-use; locating a side window region of the vehicle in the second image; processing pixels of the windshield region of the second image for computing a feature vector describing the side window region of the vehicle; applying the feature vector to a classifier for classifying the second image into respective classes including at least classes for candidate electronic device use and candidate electronic device non-use; and, outputting the classifications of the first and second images.

The computer program code comprising instructions executable by said processor can be further configured for, after locating a windshield region of the vehicle in the first image, extracting the windshield region from the image; defining a passenger side and a driver side within the windshield region, and extracting the passenger side of the windshield region from the windshield region; and/or defining a passenger side and a driver side within the windshield region, and extracting a passenger side of the windshield region from the windshield region.

The computer program code comprising instructions executable by said processor can be further configured for processing the pixels of the located second region including extracting a passenger side window region from the image.

The processing the image can be performed by a process selected from a group consisting of: a Successive Mean Quantization Transform (SMQT); a Scale-Invariant Feature Transform (SIFT); a Histogram of Gradients (HOG); a Bag-of-Visual-Words Representation; a Fisher Vector (FV) Representation; a Speeded Up Robust Feature (SURF) representation; a Local Binary Pattern (LBP) representation; and, a combination of the above.

The computer program code comprising instructions executable by said processor can be further configured for, prior to acquiring the images with the image capture device, training a classifier using at least a first sample image including a driver holding an electronic device and at least a second sample image including a driver not holding an electronic device, the first and second sample images including at least a respective first region or second region of a sample vehicle.

The computer program code comprising instructions executable by said processor can be further configured for analyzing at least one of the first or second images to detect whether a passenger is present in the vehicle, and to discard the classification of the second image when a passenger is detected.

DETAILED DESCRIPTION

The present disclosure sets forth a system and method for detecting a driver's electronic device (e.g., mobile phone) usage. The system and method utilizes machine learning in a two-phase approach, where the first phase is an offline training of a classifier and the second phase applies the trained classifier to classify the driver's electronic device usage/non-usage.

Phase 1—Offline learning, includes:

(1) Acquire positive and negative electronic device usage images within a representative region of interest (ROI) (within a windshield view, around the driver, etc.).

(2) Extract image features from the ROI's to create global feature representations of the respective ROI's.

(3) Train a classifier (e.g., Support Vector Machine (SVM)) using the extracted image features.

Phase 2—Online operation includes:

(1) Acquire an image of a scene of interest using a similar imaging system.

(2) Extract a similar ROI as above, but it is performed algorithmically.

(3) Extract the same type of image features as were used in the training.

(4) Apply the trained classifier, and use it to make a decision on electronic device usage. The candidate violators can be reviewed by a law-enforcement officer or back-office operator, and appropriate action may be taken (issue a ticket or warning, stop the vehicle, etc.).

As will be described, the system analyzes images that are acquired from a camera and then performs the method in two stages. In a first stage, the windshield region (or other region) is located and extracted from the original image. In a second stage, a feature vector (e.g vector of locally aggregated descriptors (VLAD)) is calculated for representing the windshield region. The feature vector is applied to a classifier, which indicates whether the vehicle is a candidate for electronic device use or is a candidate for electronic device non-use. A thresholding parameter can be applied to the image by the classifier for further determining whether the system performs the classification process. In another aspect of the disclosure, the system can be continually retrained while on-line using labeled ground truth from a manual verification of candidate violations.

Figure 1:
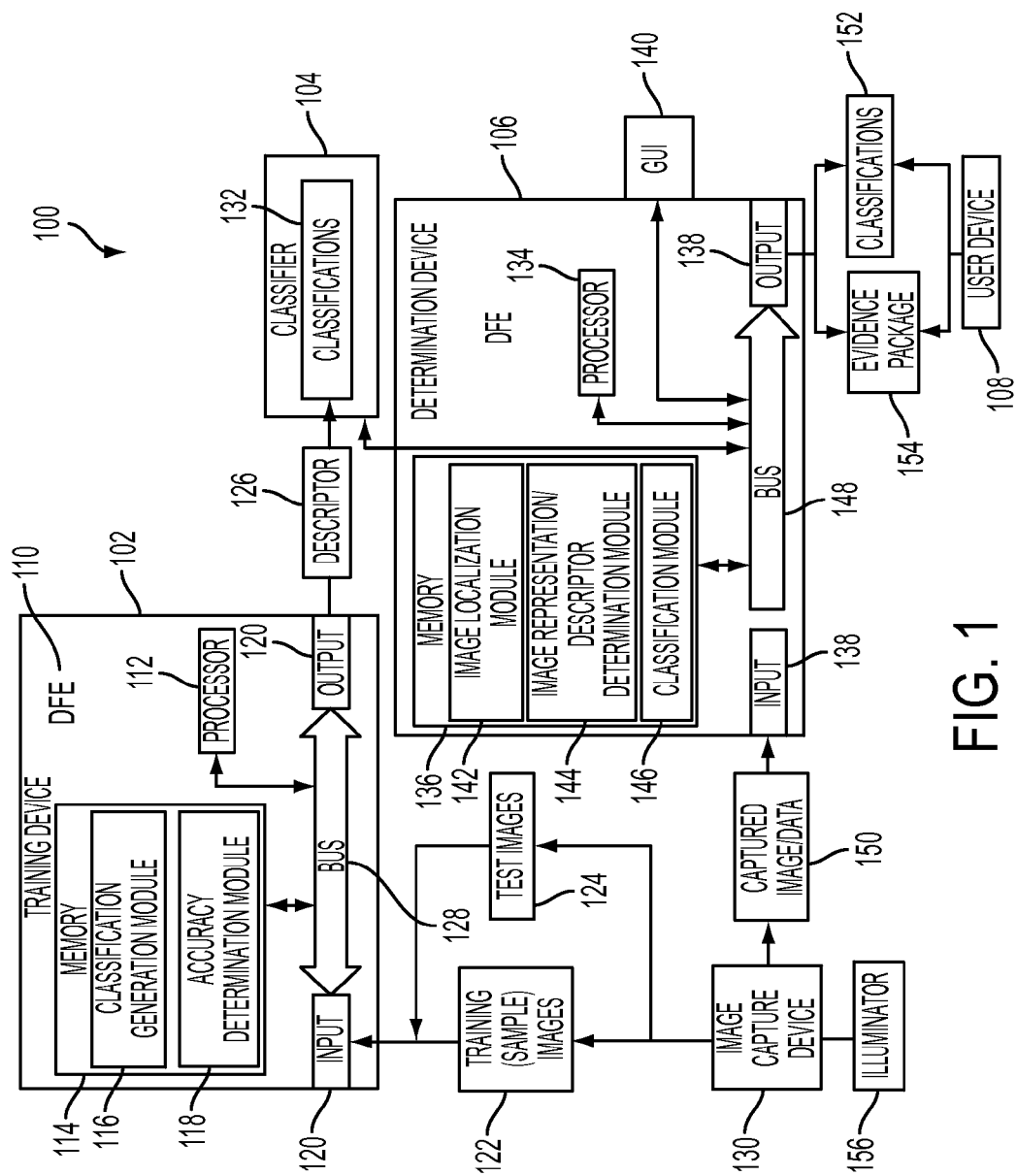
FIG. 1 is a schematic illustration of an exemplary system in accordance with the present disclosure.

Turning now to the drawings, and initially to FIG. 1, a schematic illustration of an exemplary system 100 configured to perform image analysis for detecting electronic device use by a driver of a vehicle in accordance with the present disclosure is illustrated. The system 100 includes a training device 102 (herein also referred to as a 'classifier 102'), a storage device 104, and a violation determination device 106, which may be linked together by communication links, referred to herein as a network. In one embodiment, the system 100 may be in further communication with a user device 108. These components are described in greater detail below.

The training device 102 illustrated in FIG. 1 includes a controller 110 that is part of or associated with the training device 102. The exemplary controller 110 is adapted for controlling a training of the electronic device use detection system 100 by generating at least one descriptor that can be later compared to descriptors computed from captured images. The controller 110 includes a processor 112, which controls the overall operation of the training device 102 by execution of processing instructions, which are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor 112, in addition to controlling the operation of the training device 102, executes instructions stored in memory 114 for performing the parts of the method outlined herein that is performed at the system 100. In some embodiments, the processor 112 and memory 114 may be combined in a single chip.

The training device 102 may be embodied in a networked device, although it is also contemplated that the training device 102 may be located elsewhere on a network to which the system 100 is connected, such as on a server, networked computer, or the like, or distributed throughout the network or otherwise accessible thereto. The classifier can be a Support Vector Machine (SVM), which is trained on a set of labeled windshield images according to the instructions contained in the memory 114. In particular, the memory 114 stores a classification generation module 116, which is adapted to acquire training images with labels, group images with the same label in a set, calculate features using a set of labeled data, and associate a set of features with a select classification, compute a signed distance between the vehicle image kernel transformed representations (i.e., feature vector/descriptor) in the projected feature space and a hyper-plane boundary, compare the unsigned distance to a threshold, and classify the image based on results of the comparison. Embodiments are contemplated wherein these instructions can be stored in one module. In other embodiments, a sparse network of winnow (SNoW) or a neural network can be used in place of or in addition to the SVM. The modules 116, 118 will be later described with reference to the exemplary method.

The software modules as used herein are intended to encompass any collection or set of instructions executable by the training device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions.

With continued reference to FIG. 1, the training device 102 also includes one or more communication interfaces, such as network interfaces, for communicating with external devices. The communication interfaces 120 may include, for example, a modem, a router, a cable, and and/or Ethernet port, etc. The communication interface 120 is adapted to receive sample (hereinafter "training") images 122 and test images 124 as input and provide at least one descriptor and/or class association (assigned to a set of descriptors) 126 as output. In contemplated embodiments, one communication interface can receive the input and provide the output. The various components of the training device 102 may be all connected by a bus 128.

The training device 102 may include one or more special purpose or general purpose computing devices, such as a server computer or digital front end (DFE), or any other computing device capable of executing instructions for performing the exemplary method.

FIG. 1 further illustrates the training device 102 connected to an image capture device 130 for inputting and/or receiving the training and test images 122, 124 in electronic format. The image capture device 130 may include a camera that is selected to provide the training and test images 122, 124 or it can be an input device adapted to transmit the images captured by a camera to the training device 102. For example, an input device can include a scanner, a computer, or the like. In another embodiment, the image data may be input from any suitable source, such as a workstation, a database, a memory storage device, such as a disk, or the like. The input device can be in communication with the controller 102 containing the processor 112 and memories 114.

The exemplary system 100 further includes a storage device 104 in communication with the training device 102. In a contemplated embodiment, the training device 102 can be in communication with a server (not shown) that includes a processing device and memory, such as storage device 104, or has access to a storage device 104, for storing classes/classifications that can be used by the violation determination device 106. The storage device 104 includes a repository, which stores at least one class 132 (and/or its associated descriptor) provided by the training device 102.

The violation determination device 106 is in communication with the storage device 104 and the image capture device 130. The determination device 106 is adapted to acquire captured image data 150 from the image capture device 130 positioned to view a lane or other area of interest. In the present embodiment, the image capture device 130 can be the same camera used to capture training and test images, or it can be a different camera. Here, the camera-based imaging system is proposed to capture frontal-view images a vehicle.

The system also includes at least one illuminator 156, which provides illumination that is not obtrusive to the driver but still enables robust capturing despite ambient light conditions. In one contemplated embodiment, a near infrared (NIR) illuminator 156 source is used having a wavelength greater than 750 nm. In another embodiment, a visible light illuminator is stationed to provide illumination without shining into eyes of the driver.

The exemplary determination device 106 includes, for example, a computer or microcomputer. The determination device 106 may be included as part of the image capture device 130 or it may be in communication with the image capture device 130. The determination device 106 includes a processor 134, such as a CPU, and a memory 136 for storing software modules executable on the processor of the CPU and at least one communication interface 138 including hardware and/or software suitable for providing wireless data communication with the storage device 104, the image capture device 130, and a graphical user interface (GUI) 140. The memory 136, processor 134, and communication interface(s) 138 can be similarly configured to memory 114, processor 112, and communication interface 120 of the training device 102. The exemplary software module includes an image localization module 142, which locates a windshield region (or desired side of the windshield region, or other region) of the vehicle in a captured image; an image representation determination module 144, which computes a descriptor of the windshield region for analyzing a cabin region of the vehicle using pixels of the image; and, a classification module 146, which classifies the captured image into a respective class. The various components of the violation determination device 106 may be all connected by a bus 148.

Module 144 applies an automatic detection algorithm to the image to determine whether the vehicle is a candidate offender/violator. Generally, module 144 computes an image representation(s). More specifically, the module 144 computes a descriptor for describing the cabin of the vehicle using pixels of the image. Several embodiments are contemplated for computing a descriptor. One embodiment uses a global approach, which extracts a single descriptor for describing the localized image. A global descriptor is computed from pixel statistics. Another embodiment contemplates a sub-image approach, which extracts local descriptors from small patch regions in the image. A single signature is aggregated from the patches for classification.

In a conventional object recognition approach, parts of the image are searched for objects that can be associated with specific items. The objects are labeled as including, for example, a face, a seat, a seat belt, a phone etc. The labels are then applied to a classifier for determining whether the driver is using a phone or other electronic device.

However, in the global feature representation approach, the module 144 defines a set of generic features that describe the entire image and not just parts (associated with objects and the location of objects) of the image. More specifically, the module 144 applies an algorithm that provides feature vectors describing the image data. In this manner, the computed feature vectors can be used to classify the image without requiring the use of labels of objects.

In one embodiment, the module 144 is adapted to perform a Successive Mean Quantization Transform (SMQT) approach following the technique understood in the art. Generally, the SMQT process determines a feature vector for each pixel in the image by analyzing a vicinity of the pixel. More specifically, for each pixel that is analyzed, the pixel is designated as a center pixel in a vicinity/region. An average value (0-255) for the region is determined. This average is set as a threshold value. Then, the value of each pixel in the region (i.e., the center pixel and the surrounding pixels in the region) is compared to the threshold. The pixels are each assigned a binary value based on the comparison. For example, pixels having a value below the threshold may be assigned a "0" value and pixels having a value meeting or exceeding the threshold may be assigned a "1" value. For example, a 9-bit binary number is generated for a 3×3 vicinity of a pixel using the binary values of each pixel in the region. The binary number is converted to a decimal number. This decimal number is a descriptor of the center pixel. The process then generates a feature vector using the decimal numbers for each of the pixels in the image.

In the sub-image descriptor approach, the module 144 first identifies patch regions in the image. The module 144 then extracts descriptors from the patch regions. The patch descriptors are then aggregated into image-level descriptors. Generally, the patch descriptors correspond to low-dimensional feature vectors and the image-level descriptor corresponds to a high-level feature vector.

In another embodiment using the global descriptor approach, the module 144 is adapted to extract local patches and represent them with descriptors, following techniques understood in the art such as the SIFT.

In another embodiment using the global descriptor approach, the module 144 is adapted to perform a Histogram of Gradients (HOG) process following the technique understood in the art. Generally, the HOG approach compiles histograms for localized cells (i.e., spatially connected/ overlapped cell blocks/block regions of pixels, e.g., 4×6 pixels) in an image. In one embodiment, the process can generate a histogram of gradient directions (orientations) for pixels in each cell, though other descriptors can be used such as shape, texture, and color, etc. In other words, gradients are determined for each cell and the number of occurrences of gradient orientations is counted and a histogram is formed representing the count for each of the orientations. The combination of histograms (for all cells) is used to form the descriptor the descriptor. More specifically, the descriptor is generated as feature vectors representing the normalized histograms for all block regions.

In one embodiment using the sub-image descriptor approach, the module 144 is adapted to compute a Bag-of-Visual-Words (BOW) representation using a technique that is understood in the art. This technique consists in learning a set of patch prototypes by clustering the set of low-level descriptors such as HOG or SIFT. Given a new image, each of its patch descriptors is assigned to its closest prototype and the image is described by the histogram of the number of occurrences of each prototype.

In another embodiment using the sub-image descriptor approach, the module 144 is adapted to compute a Fisher Vector (FV) Representation using a technique that is understood in the art. This technique consists in learning a probabilistic model of the low-level descriptors using, for instance, a Gaussian Mixture Model (GMM). Given a new image, it is characterized by the gradient of the log-likelihood of the image descriptors on the GMM with respect to the model parameters.

In summary, the sub-image approach extracts multiple local descriptors from the windshield sub-image and then aggregates them into a sub-image-level global descriptor. Furthermore, because the system 100 is modular, it can use other features and types of kernels in the classifier for performing the above-mentioned algorithms. In yet another embodiment, a combination of the above approaches can be used. Computing the descriptor can also extend to multiband systems, where the sets of features from images from different spectral bands can be combined. Regardless of the approach used, the module 144 transmits the descriptor/feature vector to the classification module 146.

With continued reference to FIG. 1, captured image data 150 may undergo processing by the violation determination device 106 and a classification 152 and/or evidence package 154 may be displayed to the user in a suitable form on the GUI 140 in communication with the determination device 106. The GUI 140 can include a display, for displaying information to users, and a user input device, such as a keyboard or touch or writable screen, for receiving instructions as input, and/or a cursor control device, such as a mouse, trackball, or the like, for communicating user input information and command selections to the processor 134.

In another embodiment, the information output from the determination device 106 can be provided to a user device 108, such as a computer belonging to an enforcement authority. The user device 108 can include a computer at a dispatch center, a smart phone belonging to an enforcement driver in transit (and capable of making traffic stops) or to a vehicle computer and/or GPS system that is in communication with the determination device 106.

Figure 2:
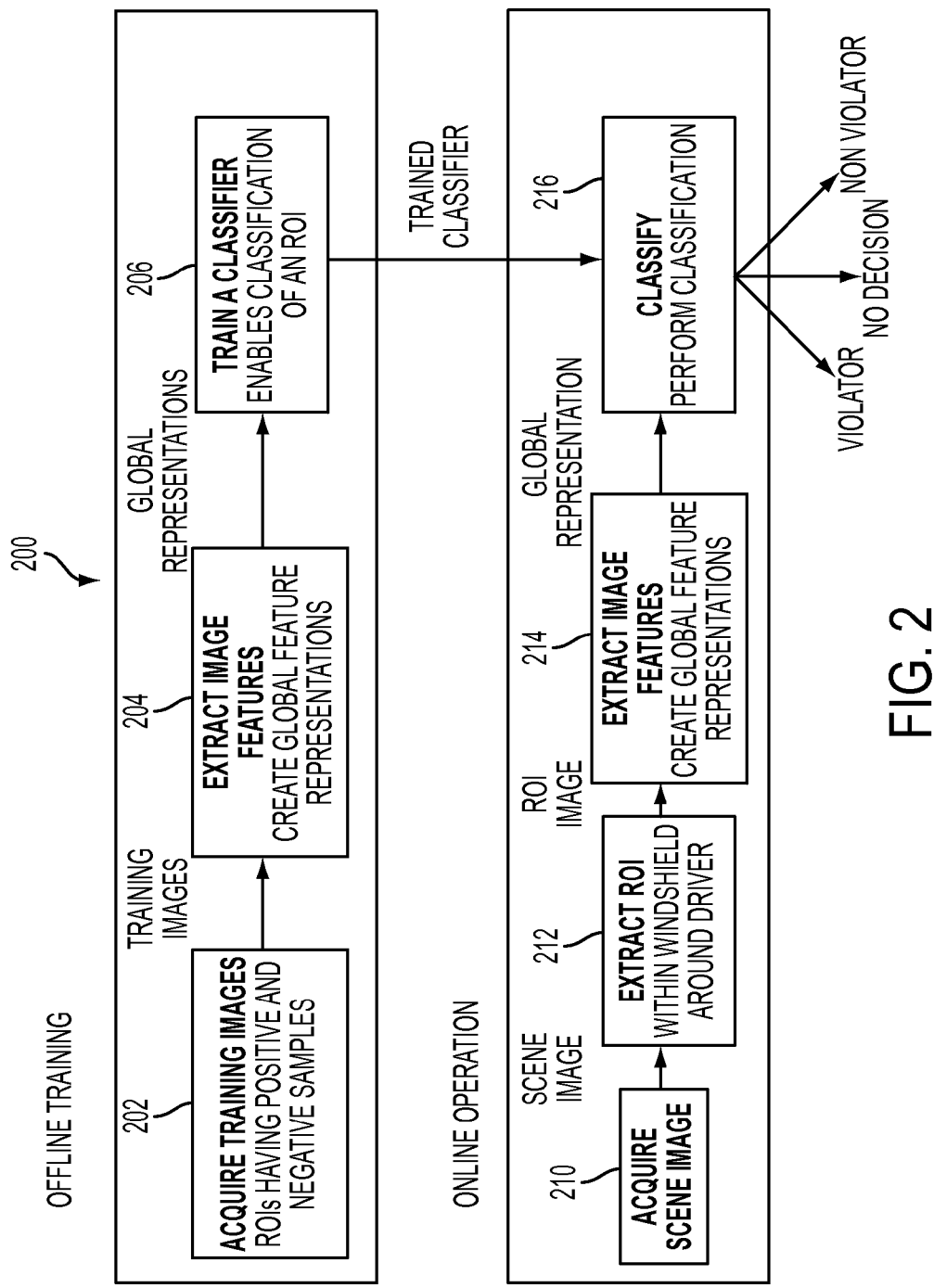
FIG. 2 is a flow chart illustrating an exemplary method in accordance with the present disclosure.

Turning now to FIG. 2, an exemplary method in accordance with the present disclosure is illustrated and identified generally by reference numeral 200. It will be appreciated that the method 200 can be carried out by the previously described system 100, or other suitable system. The method 200 generally comprises a training portion and an operation portion. That is, the method trains a classifier using positive and negative sample images in the training mode, and then utilizes the trained classifier to classify acquired images in the operation mode.

The training portion of the method 200 begins with process step 202 wherein training images are acquired. This can include acquiring images that contain a view of a windshield and a driver of a vehicle. Training images can be selected to provide a wide variety of both positive and negative samples. For example, positive image samples can include images with drivers holding electronic devices in different ways such as left/right of the face. Negative image samples can include images with drivers not holding an electronic device, and also images with drivers holding other types of objects besides an electronic device (e.g., coffee mugs) in different ways. Typically, an imaging system positioned at road-side or on a gantry would be used to capture images/videos in the near-infrared (NIR) band (~800 ~1000 nm) through the windshield of an incoming vehicle. Other wavelength bands or RGB images could be used, but it has been found that monochrome images are sufficient for achieving high accuracy, and the NIR band makes the image acquisition covert.

In training scenarios, more sample images usually result in higher classification accuracy, but practical limits are often faced, such as the number of images that can be acquired or the amount of computation and time that can be committed to training. One method to decide on a suitable number of training images is to perform cross validations on an image set. For example, the classifier can train on 90% of the images and test on the other 10% across all combinations of 90% and 10%. If the accuracy varies significantly across combinations, more or improved training samples may be needed. Improvements can include lighting, camera angles, ROI, features, etc.

Figure 3A:
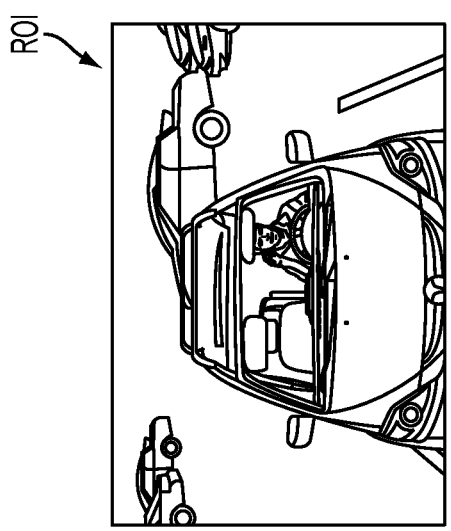
FIGS. 3A and 3B are two examples of captured images.
Figure 3B:
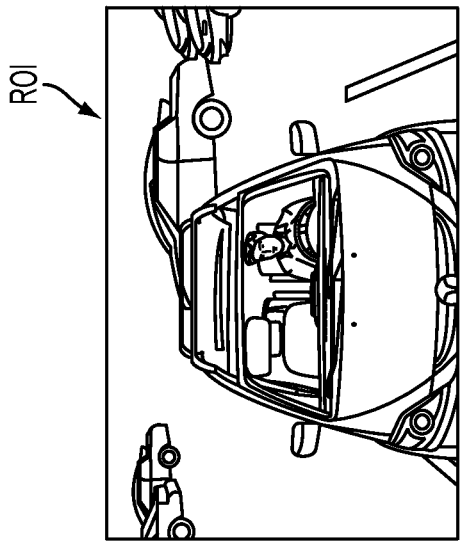
Figure 4A:
FIG. 4A is an image wherein the windshield region has been identified as the region of interest.
Figure 4B:
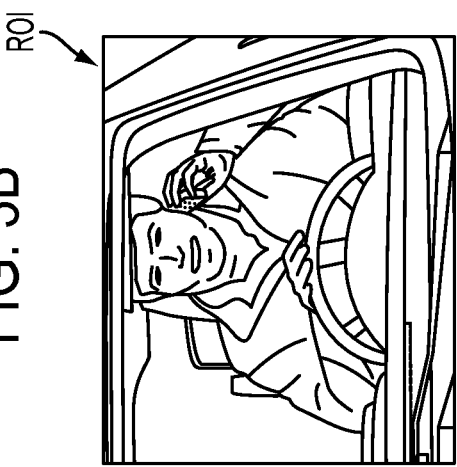
FIG. 4B is an image wherein the driver's side of the windshield has been identified as the region of interest.

For example, in FIGS. 3A and 3B, two examples of captured images I in a scene are shown. There are many advantages to focus on an ROI on a localized area. For example, in FIG. 4A the windshield is cropped as the ROI, while in FIG. 4B the driver's side of the windshield is cropped as the ROI. In addition to substantial computational cost and time savings, for a machine-learning-based approach, using a defined ROI for further processing, the classifier focuses on the relevant differentiating characteristics between violators and non-violators (e.g., driver with a mobile phone vs. driver without a phone) and not on extraneous features outside of the ROI in order to achieve better classification accuracy.

Figure 5:
FIG. 5 is an image wherein the area around the driver's head has been identified as the region of interest.

Additional optimization may include cropping the area around the driver in a particular way to minimize extraneous features. For instance, in some configurations it can be advantageous to define an ROI around the driver's face as shown in FIG. 5 (the area between the inner box and the outer box) instead of the entire driver's side of the windshield, as most drivers will hold mobile phones close to their face when they talk. This optimization can include an additional face detection step in the process.

Once the images are acquired in process step 202, image features are extracted from each of the training images to create global feature representations. The present disclosure uses a global feature representation rather than an approach that searches for specific image content (e.g., hands, a mobile phone, etc). As noted, past approaches that include searching for specific content within an image have a number of deficiencies. For example, these approaches are based on the assumption that the objects are visible to the camera. Therefore, parts of the image are analyzed to determine a location of the objects and appearance characteristics, such as color, size, texture, and shape, etc., or even the spectral characteristic, which can be extracted for detecting pixels belonging to the skin of a driver. The objects in the image that have characteristics (color, texture, spectral) matching a reference object are associated as being the same as the reference object. In other words, the object is labeled as phone or hand. One problem associated with conventional object detection is that variations in the captured image can result in incorrect classifications. For example, some drivers may hold a device in a different or awkward position that makes detection of the object difficult or impossible. Another drawback when using a spectral approach is that, to determine if two spectra are similar to each other, multiple sample points in the spectral range are needed, which generally requires a much more expensive multi- or hyper-spectral camera.

The present disclosure sets forth a method that can classify an ROI instead of looking for specific objects situated inside parts of the image. More specifically, the approach of the present disclosure makes no assumptions about the content of images in advance of the process. Accordingly, the present disclosure sets forth a feature extraction method that is adapted to process pixels of the image for determining a descriptor of the image. A feature representation can include one or more of include a Successive Mean Quantization Transform (SMQT), a Scale-Invariant Feature Transform (SIFT), a Histogram of Gradients (HOG), a Bag-of-Visual-Words Representation, a Fisher Vector (FV) Representation, or a combination thereof, for example.

In process step 206, the classifier is trained. In one example, a classifier such as SVM (Support Vector Machine) is trained with the set of labeled training images (w/ and w/o electronic device) phone). The classifier is adapted to determine a distance of the 2 classes (w/ and w/o electronic device) to a hyperplane. The classifier is further adapted to determine whether the distance meets a threshold.

Once the classifier is trained in process step 206, the method proceeds to the operational mode where new images are acquired, processed, and classified. It will be appreciated that many steps of the operational mode are similar to the training mode and, as such, the following discussion focuses on the additional features and/or differences of the operational mode.

In process step 210, a scene image is acquired. This can be done with a roadside camera in the manner described above in connection with process step 202. In process step 212, the ROI is extracted from the acquired image. In general, the same automated process for identifying/extracting the ROI can be used in both the training and operational modes. However, it should be appreciated that in the training mode, the ROI in some cases can be identified manually. In the operational mode, however, the ROI extraction would be performed in a manner compatible with automatic operation.

In process step 214, image features are extracted from the ROI and a global representation is created, and then, in process step 216, the classifier classifies the ROI. As will be appreciated, the classifier classifies the ROI in response to the location and distance of the feature representation (e.g., Fisher Vector) to the hyperplane determined in the training stage. Thresholds on distance can be used to output a definitive decision or non-decision, or a distance may be used to provide a degree of confidence. Notification of the classification can be provided in one or more ways. For example, a graphical user interface can be adapted to output the classification result to a law enforcement officer or back office operator that takes the appropriate action.

In experiments, a trained SVM classifier was used to process a test set of images. In one example, a set of 104 images (52 positives and 52 negatives) were taken at a parking lot with drivers holding a mobile phone in different positions. The set of images was randomly split into two even groups, one for training and one for testing. The method was run three times randomly selecting the positive and negative image sets. The classification results were averaged from the 3 rounds. Two false positives were generated (e.g., no phone usage by a driver is misclassified as usage) and 2 false negatives were generated (e.g., mobile phone usage is misclassified as nonusage). However, classification accuracy has exceeded 95%.

It will be appreciated that the accuracy requirement will be at least in part dependent on the final application. For example, if positive (violator) ROI's will be reviewed by a human operator, the process doesn't have to be 100% accurate. Even in the case of automatic detection (no review by human), the accuracy can be biased toward the number false negatives to reduce the number of false positives.

While analyzing the front view of an oncoming vehicle can achieve accuracy that is acceptable in many applications, this accuracy can be improved even further by consideration of an additional (second) view. For example, analyzing a second view (side view) can make the detection system more robust when that view is not occluded by a passenger on the respective viewing side. It will be appreciated that imaging data provided by an HOV/HOT image acquisition system often includes such second view and, therefore, aspects of this disclosure can be implemented upon existing image data available from such systems.

Consideration of a second view can generally include performing the method described above in FIG. 2, but utilizing a different set of training images (e.g., training images corresponding to the second view). Accordingly, the method can include two phases: an offline phase and an online phase. In the offline phase, an appearance-based model is developed for driver mobile phone usage by defining a set of landmarks from driver's face, arm, and hand. The model is then used in the online phase to detect an instance of a driver using a cell phone. The detection of a driver using a cell phone can be performed using a classical machine learning classification approach, where a region of interest is defined on the image plane and a classifier is trained by extracting a set of features from the ROI. The classifier is then leveraged in the operational phase to identify the violation. The violation information extracted from side-view images can be fused with the information acquired from the front-view images to increase the confidence of the violation decision from side-view images. In another embodiment, the detection of a driver using a cell phone can be performed by using an elastic deformation model.

For example, one approach includes encoding the elastic deformation and 3D structure of an object for face detection and pose estimation. It uses mixtures of trees (poses) with a shared pool of parts defined at each landmark position. It then uses global mixtures to model topological changes due to view points. The global mixture can be used to capture gross deformation changes for a single viewpoint. This approach evaluated each particular configuration of parts $L=\{l_i: i \in V\}$ for the given image I by a score function as shown in Eq. (1), $$S(I, L, m) = App_m(I, L) + Shape_m(L) + \alpha^m,$$

$$App_m(I, L) = \sum_{i \in V_m} w_i^m \cdot \phi(I, l_i)$$

$$Shape_m(L) = \sum_{ij \in E_m} a_{ij}^m dx^2 + b_{ij}^m dx + c_{ij}^m dy^2 + d_{ij}^m dy$$

wherein S is a score as a function of the image being analyzed I, the one or more landmark points L tuned for a mixture m, $\phi(I, l_i)$ is the HoG (Histogram of Gradients) features extracted at location $l_i$, $App_m$ is a sum of appearance evidence for placing a template $w_i^m$ for a part tuned for the mixture m at a location $l_i$ of the image. $Shape_m$ is a score of a mixture specific spatial arrangement of parts L (dx and dy are the x-axis and y-axis displacements of part i with respect to part j, and parameters (a, b, c and d) specify the spatial cost constraints between pairs of parts i and j) or a geometric relationship between the one or more landmark points (e.g., a number of pixels between a corner of an eye to an eyelid) and $a^m$ is a constant for the mixture m. $V_m$ represents a pool of parts belonging to the mixture m. $E_m$ represents a set of edges between the pool of parts in $V_m$.

During inference, we maximize Eq. (1) over L and m, $$S*(I) = \max_m \left[\max_L S(I, L, m)\right]$$

Figure 6:
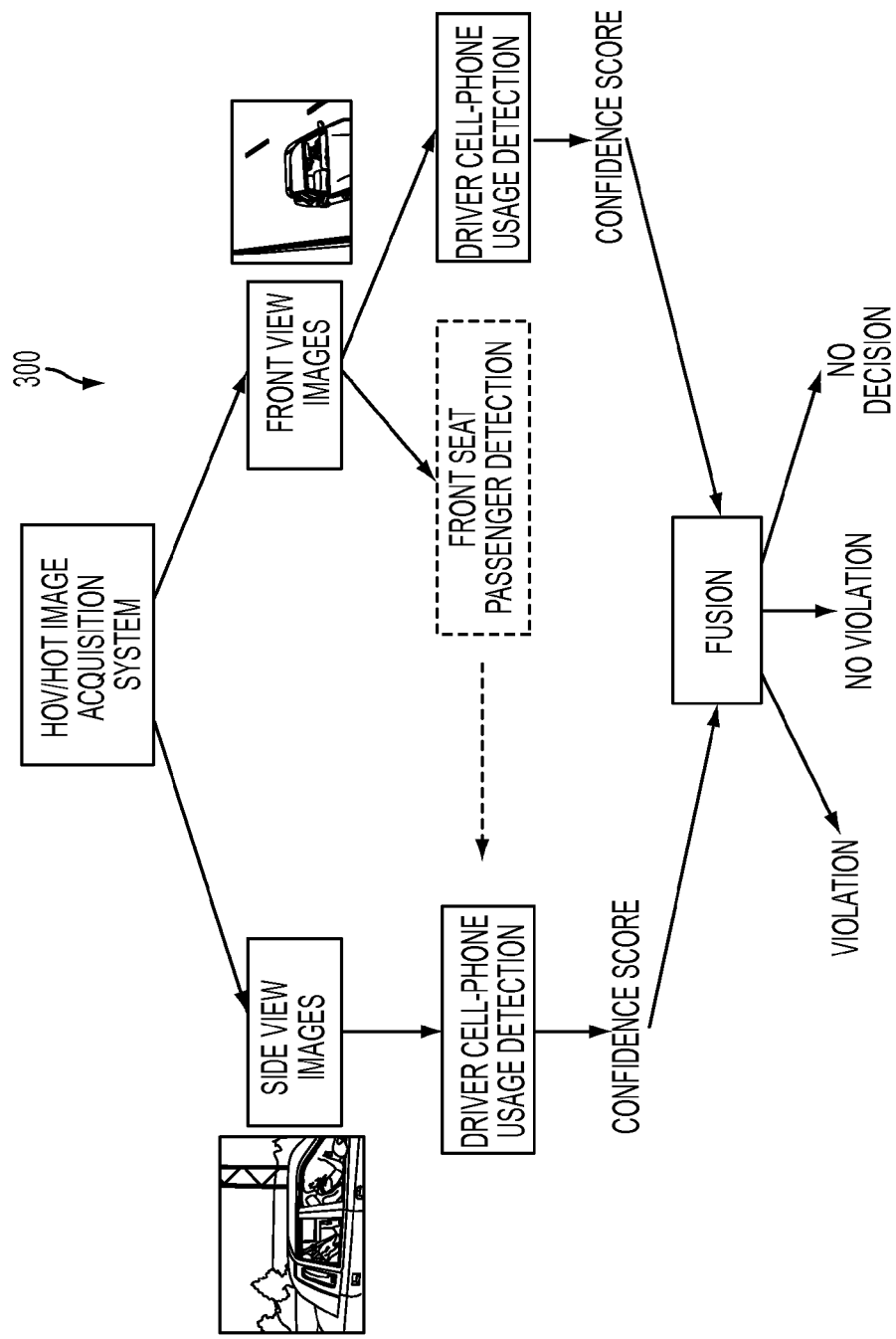
FIG. 6 is a schematic illustration of a process flow in accordance with the present disclosure.

Turning now to FIG. 6, a high level overview of an exemplary method in accordance with the present disclosure is illustrated. The details of the method are described in the detailed description below. The computer vision method is implemented within a system that includes an IR illuminator and camera.

Figure 7A:
FIG. 7A is an image captured by a front view camera.
Figure 7B:
FIG. 7B is an image captured by a side view camera.

FIG. 7 illustrates images from side view and front view captured by HOV/HOT system. As noted previously, one method to identify cell phone usage is based on a typical machine learning classification approach, where a set of features are extracted from a region of interest defined on the image plane in the offline phase. A classifier is trained using the extracted features, which is then used in the operational phase to detect a violation. Alternatively, a deformable parts model can be developed for the cell phone usage in the offline phase. The model can be then used in the operational phase to detect the violation. In an embodiment, these two approaches both can be implemented and combined to calculate a confidence score for the violation from front-view images. A confidence score for a driver using a cell phone can be output. A high positive score indicates high confidence for the violation and a high negative score (i.e., in the absolute sense) indicates high confidence for the non-violation.

It will be appreciated that the side-view images can be captured by a commercial RGB or NIR camera available in the market. Alternatively, side-view images typically captured by HOV/HOT systems can be used and analyzed to detect the violation.

Figure 8:
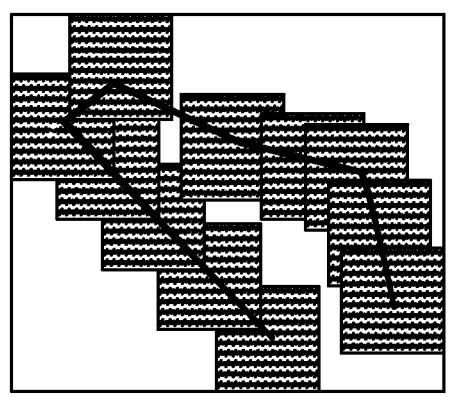
FIG. 8 is an image depicting a model wherein fourteen landmarks are located in accordance with the present disclosure.

FIG. 7 (B) shows a typical side-view image that was captured during a road test on a city street. As noted, a deformable parts model can be used for detecting a violation. For this purpose, fourteen (14) landmarks are located from the driver's arm, phone and hand to model the appearance of the driver when using a cell phone. The red dots in FIG. 8 show the located landmarks used in the model. The number of landmark points can be adjusted based on the complexity of the object in the scene and the amount of unique features to be included. For example, for detecting faces in different poses in an image, more than thirty (30) landmark points are needed in order to include unique facial features such as nose and eyes. In driver cell phone usage detection, the edges are mostly straight lines. Hence, there is less benefit to include too many landmark points. Too many points can significantly increase the amount of manual work in the training phase and computational cost in the on-line application. Because the relationships between landmark points are processed through dynamic programming, the end points of the sequence of points cannot be connected, however, where to position the end points can potentially affect the performance. Also, only one mixture was used to develop the model but more than one mixture can also be used to capture different appearances of the violation.

Figure 9A:
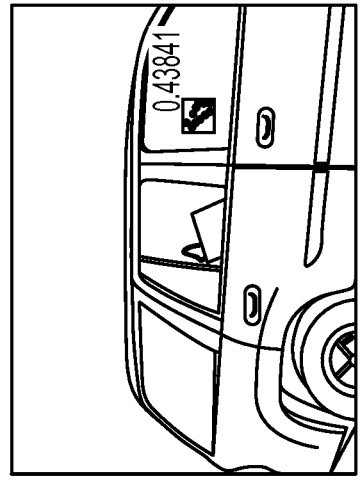
FIG. 9A is a sample image wherein the landmarks have been identified manually.
Figure 9B:
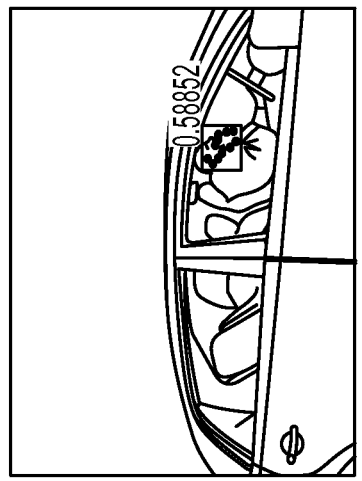
FIG. 9B is another sample image wherein the landmarks have been identified manually.

Once the set of landmark points is determined along with their relative locations within the side window, the fourteen (14) landmark points are labeled manually in a set of training images similar to FIGS. 9A and 9B in the same sequence. Negative samples were areas other than the located landmarks in the scene. The training then constructs a model by learning the appearance at each of the landmark points and the relationship between points. By applying the training model to incoming images, a list of candidate driver cell phone usage areas will be identified in each image. An example of the candidate area is shown in FIGS. 9A and 9B (boxed area) along with its classification score. Note that the classification score here corresponds to the confidence level for the detected violation (i.e., higher the score higher the confidence).

Another approach for detecting the violation from side-view images is using an approach similar to the method described in conjunction with a front view image. Such an approach would first detect the side window in the image and then define a region of interest in the detected side window. This region interest can be defined around the driver's face detected in the side window. Alternatively, the region of interest can be defined as the entire detected side window. After defining the region of interest, the method makes a classification within the detected side window using a classical machine learning approach, where a set of features are extracted from positive and negative images to train a classifier in the offline phase and the trained classifier is used in the operational phase to detect the violation. The extracted features may include one or more of Fisher Vector, VLAD, HOG, Harris corners, LBP, etc. among others. This alternative method uses automatic detection of a region of interest on the image plane. This region of interest is typically the side window, or driver's face within the detected side window.

In an embodiment, a system may employ both of the classical machine learning and deformable parts model to detect a violation from side-view images. The classification scores from each method can be fused to calculate the final confidence score for the violation. It should be appreciated that the present side view method is described using a passenger side view because that side is most relevant to HOV violation detection and the majority of cell phone holders hold the phone to their right ear. The side detection method also works viewing a vehicle from the driver side if the driver is holding the phone to their left ear.

Detection from each a front image and a side image reports a confidence level corresponding to a violation/non-violation decision. Based on the confidence levels acquired from side and front view images, a fusion can be performed to make a final decision for the violation detection. The fusion can, for example, be based on an arithmetic averaging of the confidence scores from front and side view images and then comparing the average score with a pre-defined threshold. The final confidence score can be also calculated based on any linear/non-linear combination of confidence scores obtained from front- and side-view images.

Additionally, front-view images can be used to estimate the occupancy in the front seat. This information can be particularly useful for calculating the confidence level from the side-view images. Because existence of a passenger in the front seat indicates a lower confidence for the side view as the passenger typically occludes the driver. In those cases, the final decision can be made solely/more based on the front-view image.

To evaluate the performance of the proposed cell-phone violation detection technique, accuracy, sensitivity (detection rate), and specificity (1—miss rate) performance metrics are utilized. Table 1 below presents the performance for the method in accordance with the present disclosure for 130 images. Ground truth for these images was obtained manually by visual inspection of the images.

TABLE 1

Mean accuracy, sensitivity and specificity performances of the proposed method.
Method/Metric

| Accuracy | Sensitivity | Specificity |
|---|---|---|
| 0.90 | 0.8312 | 1 |

The disclosed method achieves a 90% accuracy rate and 100% specificity rate for the dataset. Note that the high specificity rate indicates that the disclosed method does not result in false alarms.

Figure 10:
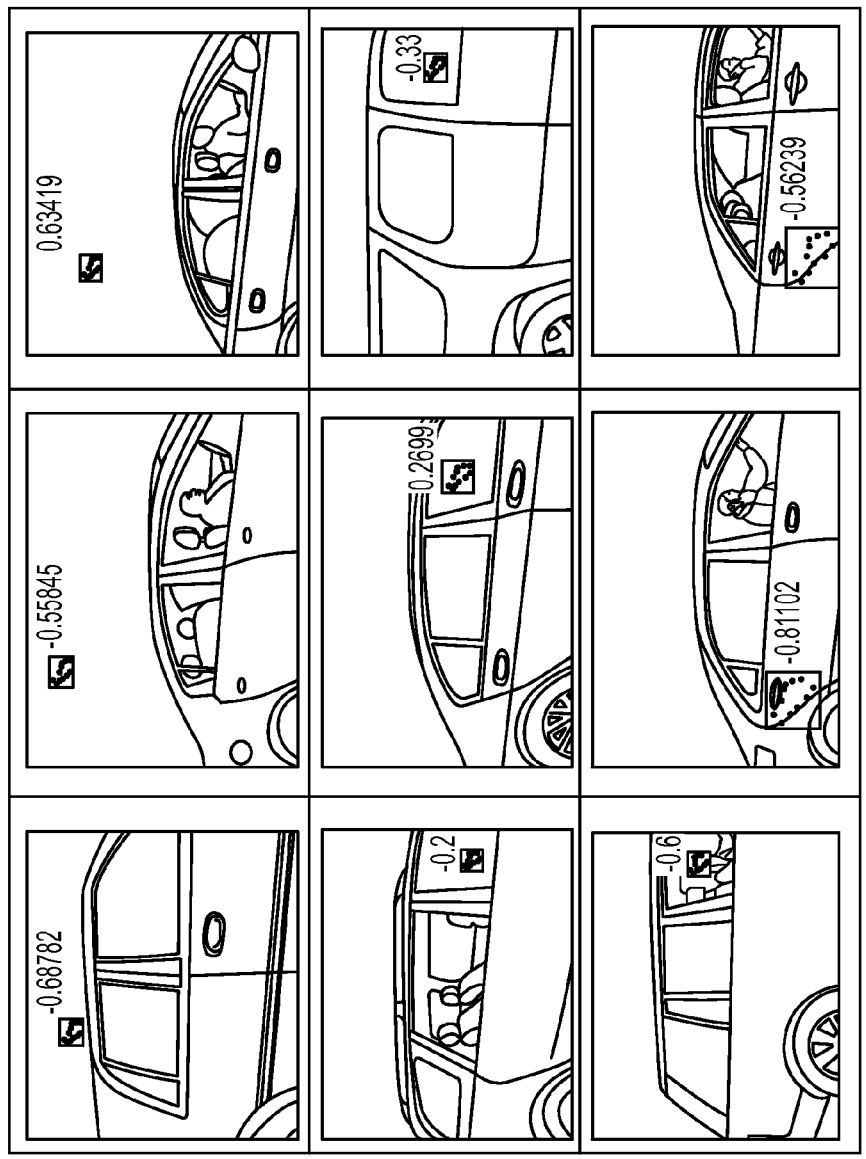
FIG. 10 illustrates sample results of the detection system and method in accordance with the present disclosure.

FIG. 10 presents sample results of running the cell-phone detection method on test images. The top three images were classified as violators, the middle three images were classified as non-violators, and the bottom three images were undetermined.

It will be appreciated that aspects of the present disclosure can be applied to images containing various views of a vehicle including, but not limited to, a front view (windshield) and/or a sideview (side window). Accordingly, although some embodiments are described in connection with one or another specific view (e.g., front or side view), the embodiments are equally applicable to one or more other views of a vehicle (e.g., side or front view). Moreover, it will be appreciated that the system described above can be configured to implement aspects of the disclosure on a variety of views including, but not limited to, front views and side views.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for detecting electronic device use by a driver of a vehicle, the method comprising:
acquiring a first image including a vehicle from an associated non-multispectral image capture device positioned to view oncoming traffic, the first image including a windshield of the vehicle;
locating a first region of the vehicle in the first image;
processing pixels of the first region of the first image for computing a first feature vector describing a windshield region of the vehicle;
applying the first feature vector to a classifier for classifying the first image into respective classes including at least classes for candidate electronic device use and candidate electronic device non-use;
acquiring a second image including the vehicle from an associated non-multispectral image capture device positioned to view oncoming traffic, the second image including a front passenger side window or a driver side window of the vehicle;
locating a second region of the vehicle in the second image;
processing pixels of the second region of the second image for computing a second feature vector describing a side window region of the vehicle;
applying the second feature vector to a classifier for classifying the second image into respective classes including at least classes for candidate electronic device use and candidate electronic device non-use;
analyzing the first image to detect whether a passenger is present in the vehicle;
calculating a confidence score for each of the first and second images;
wherein the calculating the confidence score for the second image includes discounting the confidence score of the second image when a passenger is detected in the first image; and,
outputting the classification of the first image and the classification of the second image;
wherein processing the pixels in the images is performed by a process selected from a group consisting of:
a Successive Mean Quantization Transform (SMQT);
a Scale-Invariant Feature Transform (SIFT);
a Histogram of Gradients (HOG);
a Bag-of-Visual-Words Representation;
a Fisher Vector (FV) Representation; and,
a combination of the above.

2. The method of claim 1, wherein processing the pixels of the located first region includes extracting the windshield region from the first image.

3. The method of claim 2, further comprising defining a passenger side and a driver side within the windshield region, and extracting the driver side of the windshield region from the windshield region.

4. The method of claim 2, further comprising defining a passenger side and a driver side within the windshield region, and extracting the passenger side of the windshield region from the windshield region.

5. The method of claim 1, wherein the processing the pixels of the located second region includes extracting a passenger side window region from the image.

6. The method of claim 1 further comprising, before acquiring the images, training a classifier using at least a first sample image including a driver holding an electronic device and at least a second sample image including a driver not holding an electronic device, the first and second sample images including at least a corresponding first region or second region of a sample vehicle.

7. The method of claim 1 further comprising, in response to the vehicle being classified as a candidate electronic device user, performing further processing on at least one of the first or second images for determining whether the vehicle is a violator or non-violator.

8. The method of claim 1, wherein the classification of the second image is discarded when a passenger is detected in the first image.

9. A system configured to perform image analysis for detecting electronic device use by a driver of a vehicle comprising:
    at least one non-multispectral image capture device operably connected to a data processing device that captures a first image of a vehicle including a windshield region and a second image of the vehicle including a side window region; and
    a processor-usable medium embodying computer code, said processor-usable medium being coupled to said data processing device, said computer code comprising instructions executable by said data processing device and configured for:
        locating a windshield region of the vehicle in the first image;
        processing pixels of the windshield region of the first image for computing a first feature vector describing the windshield region of the vehicle;
        applying the first feature vector to a classifier for classifying the first image into respective classes including at least classes for candidate electronic device use and candidate electronic device non-use;
        locating a side window region of the vehicle in the second image;
        processing pixels of the side window region of the second image for computing a second feature vector describing the side window region of the vehicle;
        applying the second feature vector to a classifier for classifying the second image into respective classes including at least classes for candidate electronic device use and candidate electronic device non-use;
        analyzing the first image to detect whether a passenger is present in the vehicle;
        calculating a confidence score for each of the first and second images;
        wherein the calculating the confidence score for the second image includes discounting the confidence score of the second image when a passenger is detected in the first image; and,
        outputting the classifications of the first and second images;
        wherein processing the pixels in the images is performed by a process selected from a group consisting of:
            a Successive Mean Quantization Transform (SMQT);
            a Scale-Invariant Feature Transform (SIFT);
            a Histogram of Gradients (HOG);
            a Bag-of-Visual-Words Representation;
            a Fisher Vector (FV) Representation; and,
            a combination of the above.

10. The system as set forth in claim 9, wherein said computer code comprising instructions executable by said data processing device is further configured for, after locating a windshield region of the vehicle in the first image, extracting the windshield region from the first image.

11. The system as set forth in claim 10, wherein said computer code comprising instructions executable by said data processing device is further configured for defining a passenger side and a driver side within the windshield region, and extracting the driver side of the windshield region from the windshield region.

12. The system as set forth in claim 10, wherein said computer code comprising instructions executable by said data processor device is further configured for defining a passenger side and a driver side within the windshield region, and extracting the passenger side of the windshield region from the windshield region.

13. The system as set forth in claim 9, wherein said computer code comprising instructions executable by said data processing device is further configured for processing the pixels of the located side window region including extracting a passenger side window region from the second image.

14. The system as set forth in claim 9, wherein said computer code comprising instructions executable by said data processing device is further configured for, prior to acquiring the images with the at least one image capture device, training a classifier using at least a first sample image including a driver holding an electronic device and at least a second sample image including a driver not holding an electronic device, the first and second sample images including at least a respective first region or second region of a sample vehicle.

15. The system as set forth in claim 9, wherein said computer code comprising instructions executable by said data processing device is further configured for, in response to the vehicle being classified as a candidate electronic device user, performing further processing on the images for determining whether the vehicle is a violator or non-violator.

16. The system as set forth in claim 9, wherein said computer code comprising instructions executable by said data processing device is further configured to discard the classification of the second image when a passenger is detected in the first image.

* * * * *